United States Patent
Tobinaga et al.

(10) Patent No.: US 9,982,658 B2
(45) Date of Patent: May 29, 2018

(54) OFFSHORE WIND TURBINE, METHOD FOR CONSTRUCTING OFFSHORE WIND TURBINE, AND OFFSHORE WIND POWER GENERATOR

(71) Applicant: Hitachi, Ltd., Chiyoda-ku, Tokyo (JP)

(72) Inventors: Ikuo Tobinaga, Tokyo (JP); Tsukasa Uenaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days. days.

(21) Appl. No.: 15/342,771

(22) Filed: Nov. 3, 2016

(65) Prior Publication Data

US 2017/0138351 A1 May 18, 2017

(30) Foreign Application Priority Data

Nov. 16, 2015 (JP) ................................. 2015-218298

(51) Int. Cl.
| | |
|---|---|
| *E02D 27/10* | (2006.01) |
| *E02D 27/12* | (2006.01) |
| *E02D 27/50* | (2006.01) |
| *E02D 27/52* | (2006.01) |
| *E02D 27/42* | (2006.01) |
| *F03D 13/25* | (2016.01) |
| *F03D 13/10* | (2016.01) |

(52) U.S. Cl.
CPC ............. *F03D 13/25* (2016.05); *E02D 27/10* (2013.01); *E02D 27/12* (2013.01); *E02D 27/425* (2013.01); *E02D 27/50* (2013.01); *E02D 27/52* (2013.01); *F03D 13/10* (2016.05); *F05B 2220/706* (2013.01); *F05B 2230/6102* (2013.01); *F05B 2240/2211* (2013.01); *F05B 2240/912* (2013.01); *F05B 2240/95* (2013.01)

(58) Field of Classification Search
CPC ....... F03D 13/10; F03D 13/25; E02D 27/425; E02D 27/52
See application file for complete search history.

(56) References Cited

U.S. PATENT DOCUMENTS

| | | |
|---|---|---|
| 2004/0131467 A1 | 7/2004 | Wobben |
| 2008/0152496 A1 | 6/2008 | Wobben |
| 2010/0019503 A1 | 1/2010 | Wobben |

FOREIGN PATENT DOCUMENTS

| | | | |
|---|---|---|---|
| DE | 10145414 | * | 9/2002 |
| JP | 2006-9596 A | | 1/2006 |
| WO | WO 03/025392 A1 | | 3/2003 |

* cited by examiner

*Primary Examiner* — Tara Mayo-Pinnock
(74) *Attorney, Agent, or Firm* — Crowell & Moring LLP

(57) ABSTRACT

A method for constructing an offshore wind turbine includes: attaching all or a part of electrical products to a tower on land; stowing, on a work platform, the tower to which the electrical product is attached; and disposing, on a foundation, the tower, to which the electric product is attached, by using a crane of the work platform in the sea. In addition, the electrical products are classified into special high-voltage devices and the other electrical products, the special high-voltage devices are modularized on land, the other electrical products are attached to the tower on land, and the modularized special high-voltage devices and the tower, to which the other electrical products are attached, are disposed on the foundation by using the crane of the work platform in the sea.

11 Claims, 14 Drawing Sheets

(1)

(2)

(1)

(2)

(3)

(1)

(2)

OFFSHORE WIND TURBINE, METHOD FOR CONSTRUCTING OFFSHORE WIND TURBINE, AND OFFSHORE WIND POWER GENERATOR

BACKGROUND OF THE INVENTION

Field of the Invention

The present invention relates to a method for constructing an offshore wind turbine, an offshore wind turbine, and offshore wind power generating equipment, and, particularly to a method for installing a tower and an electrical product of the wind turbine.

Background Art

Offshore wind power generation has merits, compared to onshore wind power generation, in that wind conditions are good, wind turbulence less occurs, there is no constraints of land or a road, and it is relatively easy to introduce a large wind turbine. Thus, it is possible to stably and efficiently generate power or to increase the wind turbine in size.

However, compared to the onshore wind power generation, the offshore wind power generation is performed in high costs due to construction costs of a foundation of an offshore wind turbine or the offshore wind turbine and maintenance costs.

For example, as disclosed in JP-A-2006-9596, in a case of wind power generating equipment that includes a tower having an accommodation room in a bottom portion and a substation switch device provided inside the accommodation room, there is proposed a method in which a transformer is disposed on a foundation, amount base is disposed to have a support surface thereof disposed above the transformer, a switch device is positioned on the support surface of the mount base, then, the tower is disposed to cover the foundation such that the transformer, the mount base, and the switch device are accommodated in the accommodation room.

In addition, WO 2003/025392 A1 discloses a method for constructing a wind power generating device of which an object is to significantly shorten a total construction time of wind power generating equipment. In other words, in WO 2003/025392 A1, a foundation of the wind power generating equipment is constructed, then, a power module (a transformer, a switch cabinet, or the like) is disposed on the foundation, and then the tower is caused to stand upright. In addition, the power module is formed in a method of assembly as much as possible and is mounted on a carrier, and the power module is disposed on the foundation of the tower by using a crane in a case where the wind power generating equipment is constructed.

The method for constructing the wind power generating equipment is proposed in JP-A-2006-9596 and WO 2003/025392 A1; however, there is room for improvement in an offshore wind turbine. According to study by the inventors, when an installation operation in the offshore wind turbine is modified, it is possible to shorten an offshore construction time, which is taken to install a tower and an electrical product of the offshore wind turbine.

In a case where an offshore wind farm is constructed, for example, a self-elevating type work platform referred to as a self elevating platform (SEP) barge is used; however, an operation performed by using the work platform is high in costs and construction costs are increased when the construction period of an operation performed by using the work platform is prolonged. Hence, when shortening of the construction period of an operation performed by using the work platform brings about reduction in construction costs.

An object of the invention is to provide a method for constructing an offshore wind turbine, an offshore wind turbine, and offshore wind power generating equipment, in which it is possible to shorten an offshore construction period and thus it is possible to reduce construction costs of the offshore wind turbine when the offshore wind turbine is installed on a foundation.

SUMMARY OF THE INVENTION

According to an aspect of the invention, there is provided a method for constructing an offshore wind turbine including: attaching all or a part of electrical products to a tower on land; stowing, on a work platform, the tower to which the electrical product is attached; and disposing, on a foundation, the tower, to which the electric product is attached, by using a crane of the work platform in the sea.

In addition, according to another aspect of the invention, there is provided an offshore wind turbine including: a tower that is disposed on a foundation in the sea; and electrical products. In the offshore wind turbine, the tower is configured to be divided into a plurality of tower sections in a height direction, the electrical products are classified into a first electrical product group that is disposed on the foundation and a second electrical product group that is disposed in the tower, the electrical products in the first electrical product group are modularized and are disposed in an accommodation space formed in the foundation, and the electrical products in the second electrical product group are attached to the lowermost tower section of the plurality of tower sections.

According to the invention, when an offshore wind turbine is installed on a foundation, it is possible to reduce operations performed by using a crane of a work platform, it is possible to shorten a construction period in the sea, and it is possible to reduce construction costs of the offshore wind turbine.

Problems, configurations, or effects other than those described above will be clearly described in the following embodiment.

DETAILED DESCRIPTION OF THE INVENTION

Figure 1:
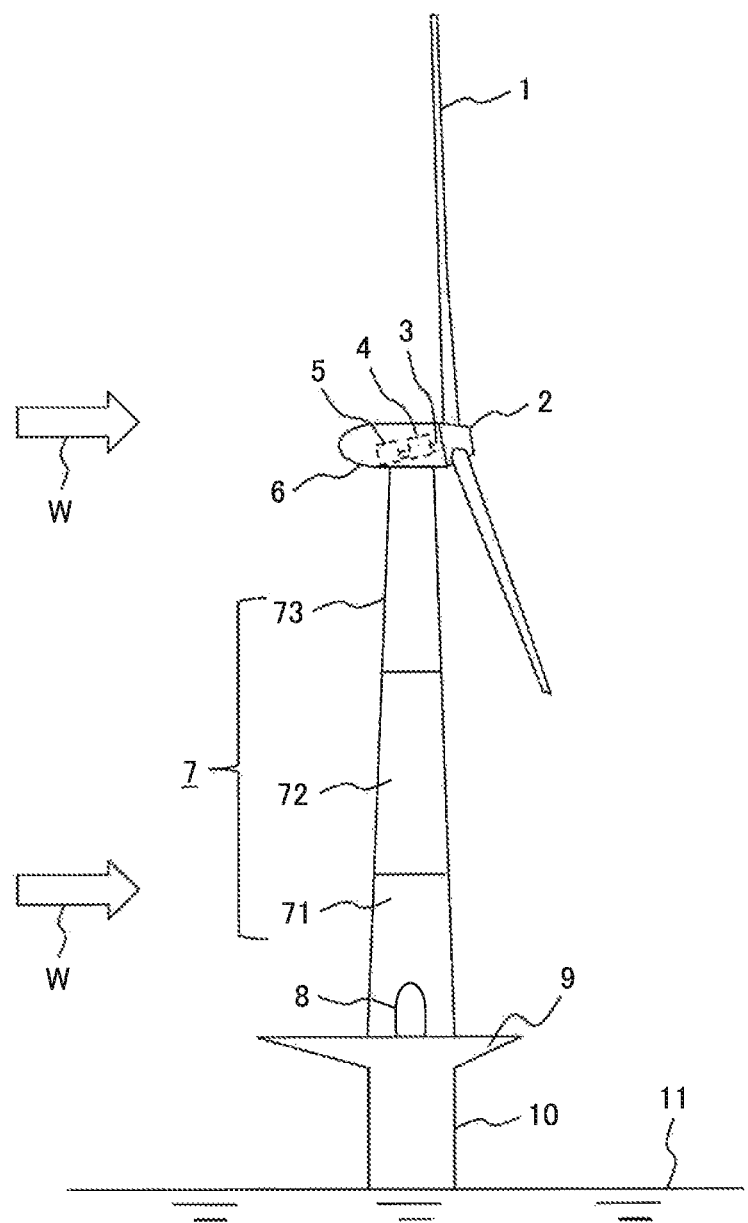
FIG. 1 is a schematic view of the external appearance of offshore wind power generating equipment of the invention.

First, an overview of the invention including a background leading to the invention or the like is described in detail.

In a case where offshore wind power generating equipment is constructed in the sea, self-elevating type work platform referred to as a self elevating platform (SEP) barge is used. In the related art, in a case where an offshore wind turbine is installed on a foundation, an operation of disposing an electrical product that is heavy, such as a transformer or a control panel and an operation of disposing a tower on the foundation by using a crane of the work platform in the sea are performed. The inventors have noticed that the majority of the heavy electrical products (internal devices) are supported by and fixed to the tower after the installation of the offshore wind turbine, and found that, if all of or a part of the electrical products are attached to the tower on land, operations of installing the electrical products in the sea are reduced, thus, it is possible to reduce an operation of installing the tower using the crane of the work platform, and it is possible to shorten a construction time of the operations using the work platform. For example, in a case where all of the heavy electrical products are attached to the tower on land, only an operation of disposing the tower on the foundation results in the end of the operations which need to be performed by using the crane of the work platform, in the installation operation of the tower including the electrical products on the foundation. Note that, after the installation operation of the tower, operations of disposing a nacelle and blade are performed by using the crane of the work platform.

In addition, in a case where there are heavy electrical products (crane operation requiring electrical products) on which it is not possible or is difficult to perform the attachment to the tower on land, or in a case where there are heavy electrical products (crane operation requiring electrical products) which are not attached to the tower due to another prioritized object, the heavy electrical products (crane operation requiring electrical products) are modularized such that the modularized electrical products are hung on the crane of the work platform, as one unit of an operation. Then, all of the heavy electrical products (crane operation requiring electrical products) other than the modularized electrical products are attached to the tower on land. In this manner, regarding the installation operation of the tower including the electrical products on the foundation, when installation of the modularized electrical products on the foundation is performed, and then the tower, to which the electrical products are attached, is installed on the foundation, operations that require the crane of the work platform are finished. According to the invention, the modularized electrical products correspond to special high-voltage devices such as a transformer or a switch device according to the following reasons.

In a case where the special high-voltage devices are disposed on the foundation, in general, an entrance (door) into the tower is provided in a bottom portion of the tower, and thus, maintenance and inspection has to be performed by the movement through a flank of the special high-voltage device disposed in a narrow space in the tower, to a floor or the nacelle in the tower in which the electrical products such as the control panel are disposed. In an example of the invention, the electrical products of the wind turbine are classified into special high-voltage devices (electrical devices in a first electrical product group) and the other electrical products (electrical products in a second electrical product group), and the special high-voltage devices are modularized and are collectively disposed in an accommodation space in the foundation. In other words, if the accommodation space is provided in the foundation below the top end of the foundation, and the special high-voltage devices such as modularized transformer or switch device are disposed in the accommodation space, the special high-voltage devices are disposed below (lower level) the entrance to the tower. Therefore, when the movement is performed from the entrance to the tower toward the nacelle, there is no need to pass through the immediate flank of the special high-voltage device, and thus it is possible to reduce a risk of electric shock. In addition, since the electrical products are vertically disposed with the entrance into the tower as a reference, it is possible to reduce the height in the tower in which the electrical products are disposed, it is possible to reduce a distance from the entrance to each of the electrical products in the tower, and it is possible to efficiently perform the maintenance and inspection or a repair operation. Note that, in an example of the invention to be described below, although an auxiliary transformer does not correspond to the special high-voltage devices, the auxiliary transformer or the like is also included in the electrical products in the first electrical product group. In other words, in the example of the present invention, the first electrical product group includes all of the special high-voltage devices, and includes the electrical products such as the auxiliary transformer as necessary.

Hereinafter, an example of the invention will be described in detail with reference to the figures.

FIG. 1 is a schematic view of the external appearance of offshore wind power generating equipment to which the invention is applied. The offshore wind power generating equipment is configured to include a foundation that is disposed in the sea and an offshore wind turbine that is disposed on the foundation. The offshore wind power generating equipment illustrated in FIG. 1 is an example of a downwind type wind turbine; however, the invention can be applied to an upwind type wind turbine.

The offshore wind power generating equipment is constructed through processes of disposing a foundation structure, laying a submarine cable, disposing an offshore wind turbine on the foundation structure, or the like. The foundation structure is a footing portion of the offshore wind turbine, and an imbedding type foundation or a floating type foundation (floating structure) is used as the foundation structure. As the imbedding foundation, a monopile type, a gravity type (weight foundation), a jacket type, or a hybrid type weight foundation of the weight foundation and jacket foundation, or the like is used. In the floating type foundation, the floating structure is fixed to the ocean floor by a mooring system configured to include a mooring cable, an anchor, or the like. In the example, a monopile type foundation 10 is used. The foundation 10 is configured to project from a sea surface 11, in order to prevent a joined surface (connection surface) between the lower end of a tower 7 and the top end (upper end) of the foundation 10 from being infiltrated by seawater, the top end of the foundation 10 is set at a high position (for example, a position tens of meters apart from the sea surface 11) which is not reached by a wave. Note that the top end of the foundation 10 is the top surface of a flange surface of the joined portion of the tower 7. A platform 9 is also formed substantially at the same height as the position of the top end of the foundation 10, and a tower door 8 is formed directly above the platform 9.

A nacelle 6 is disposed in the top portion of the tower 7. A rotor 2 having a blade 1 and a hub is journaled in the nacelle 6. The rotor 2 is connected to a main shaft 3, and further to a power generator 5 via a speed-up gear 4. Note that the speed-up gear 4 may not be available, but, a direct drive type power generator may be used. The power generator 5 is connected, by a power cable (not illustrated), to the electrical products (not illustrated) such as a power converter or a transformer, which is built in a lower side of the tower 7. Electrical energy generated when the power generator 5 rotates is rectified by a power converter and further a voltage of the generated energy is adjusted by the transformer, and then the adjusted energy is transmitted to a power system on land via the submarine cable (not illustrated).

The submarine cable is configured of an electrical cable and a communication cable, the power generated by the offshore wind turbine is transmitted to the land through the electrical cable, and information communication is performed between equipment on the land side and the offshore wind turbine through the communication cable such that state monitoring, a remote operation of the offshore wind turbine and the like are performed. The submarine cable is drawn to the lower portion of the foundation, and is drawn through the accommodation space in the foundation or into the tower through the inside of the foundation. Note that the submarine cable is drawn upward along an outer surface of the foundation and may be drawn from the top of the platform 9 into the tower 7.

Next, a method (method of installing the tower and the electrical products of the offshore wind turbine) for constructing the offshore wind turbine will be described. In the example, operations are divided into an operation performed on land and an operation performed in the sea.

In the example, the special high-voltage devices such as the transformer or the switch devices are modularized on land, and all or a part of the other electrical products (internal devices) are attached to the tower. Specifically, it is preferable that all of the electrical products, on which the crane operation has to be performed, are attached to the tower.

In the example, the tower is configured to be divided into three tower sections 71, 72, and 73.

The tower sections are manufactured in a factory, the attachment of the electrical products or the like is performed on land (hereinafter, called a land operating place) close to a harbor in which the work platform is anchored.

Figure 2:
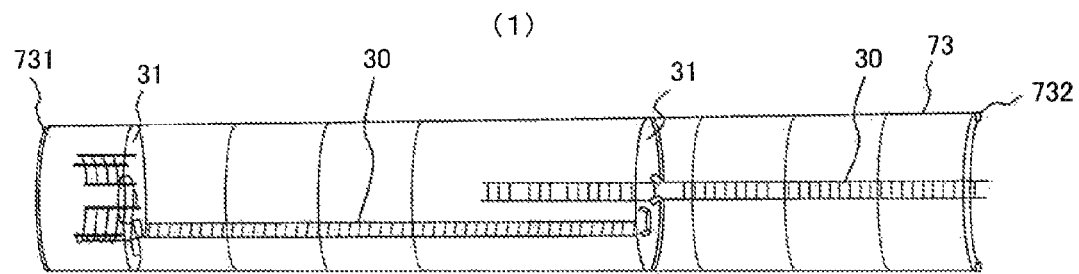
FIG. 2 is a view depicting the uppermost tower section of a tower that is divided into three sections.
Figure 2:
Figure 2:
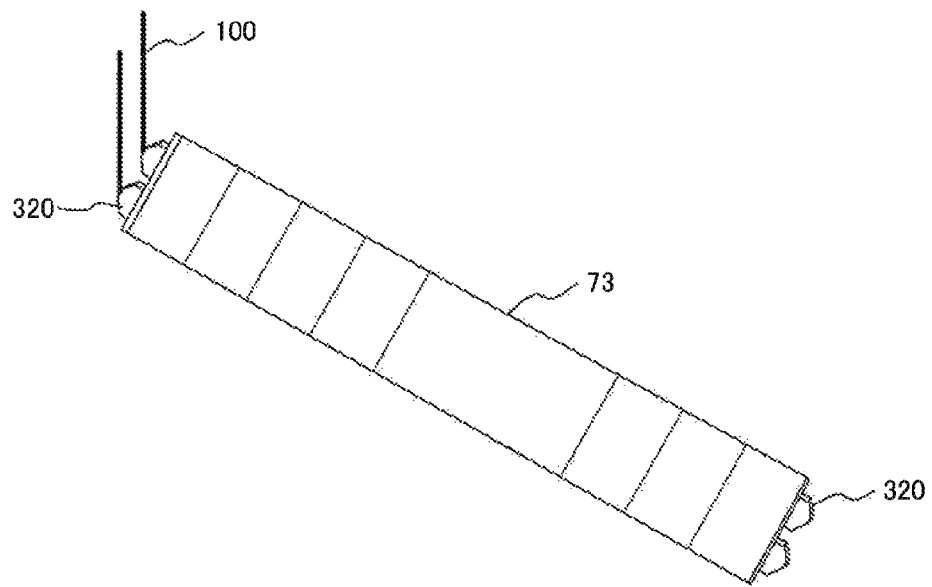

FIG. 2 illustrates the tower section 73. The tower section 73 is a first upper side tower section and the nacelle is attached on the top portion of the tower section. (1) of FIG. 2 illustrates the tower section 73 in a factory delivery state and an inner side of the tower of one of two sections into which the tower section is divided in a longitudinal direction of the tower. A ladder 30 or a floor 31 inside the tower is attached to the tower section 73 in advance in the factory. In addition, a rail of a lift is attached as necessary. In an onshore operation place, an internal device such as a cable hanger is attached to the tower section 73.

The attachment operation of the internal devices is ended, the hanging jigs 320 are detachably attached to a flange 731 of an upper end of the tower section 73, and a flange 732 of the lower end, respectively, after an assembly preparation is ended, and hanging is performed by the onshore crane 100 on land. The nacelle 6 is connected to the flange 731 of the upper end of the tower section 73 after the tower 7 is installed on the foundation 10. The flange 721 of the upper end of the tower section 72 is connected to the flange 732 of the lower end of the tower section 73. In addition, the flanges are formed on an inner circumference side of the tower; however, the flanges may be formed on an outer circumference side of the tower.

Figure 3:
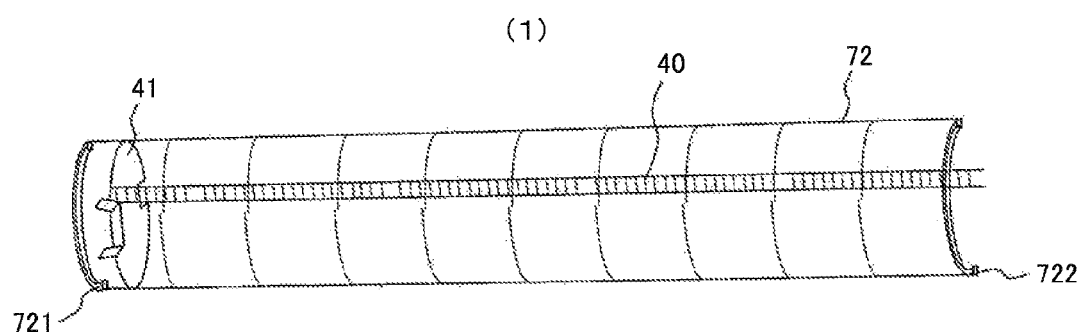
FIG. 3 is a view depicting the intermediate tower section of the tower that is divided into the three sections.
Figure 3:
Figure 3:
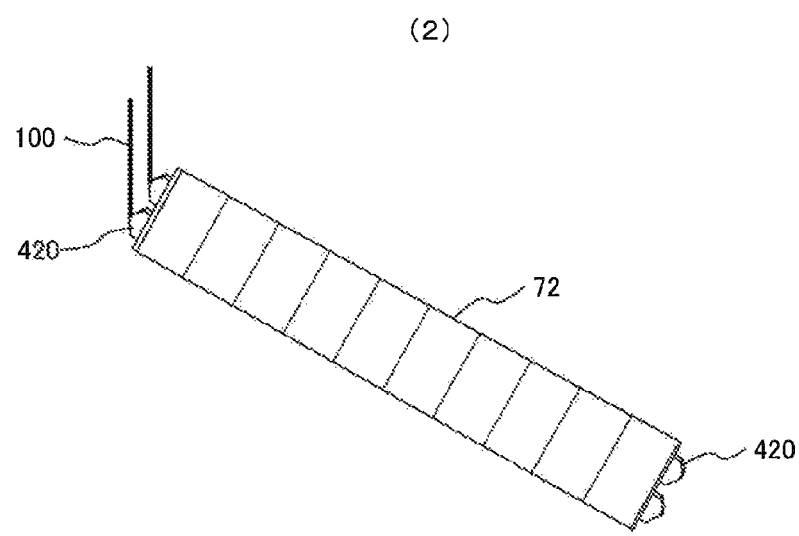

FIG. 3 illustrates the tower section 72. The tower section 72 is an intermediate tower section of the tower. (1) of FIG. 3 illustrates the tower section 72 in a factory delivery state and an inner side of the tower of one of two sections into which the tower section is divided in a longitudinal direction of the tower. A ladder 40 or a floor 41 inside the tower is attached to the tower section 72 in advance in the factory. In addition, a rail of a lift is attached as necessary. In the onshore operation place, an internal device is attached to the tower section 72.

The attachment operation of the internal devices is ended, hanging jigs 420 are detachably attached to the flange 721 of an upper end of the tower section 72, and a flange 722 of the lower end, respectively, after an assembly preparation is ended, and hanging is performed by the onshore crane 100 (note that only a hanging rope is illustrated in the onshore crane 100, hereinafter the same). The flange 732 of the lower end of the tower section 73 is connected to the flange 721 of the upper end of the tower section 72. A flange 711 of the upper end of the tower section 71 to be described below is connected to the flange 722 of the lower end of the tower section 72. In addition, the flanges are formed on an inner circumference side of the tower; however, the flanges may be formed on an outer circumference side of the tower.

In the example, since there is no heavy product that requires the onshore crane of the internal devices which are attached to the tower sections 72 and 73, the internal devices are attached to the tower sections in a state in which the tower sections 72 and 73 are horizontally laid. In a case where the onshore crane is required for the attachment operation of the internal devices, the operation is performed in a state in which the tower sections 72 and 73 stand to be upright. In this case, the floors 31 and 41 in the tower are configured of an opening/closing type or the like, and thus time and effort are required, such that the floors 31 and 41 in the tower do not interfere with the crane operation.

Figure 4:
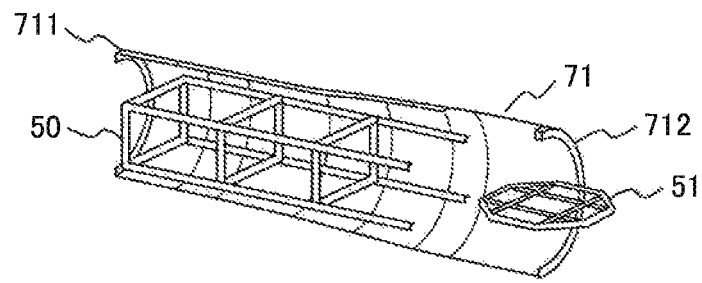
FIG. 4 is a view depicting the lowermost tower section of the tower that is divided into the three sections.
Figure 4:
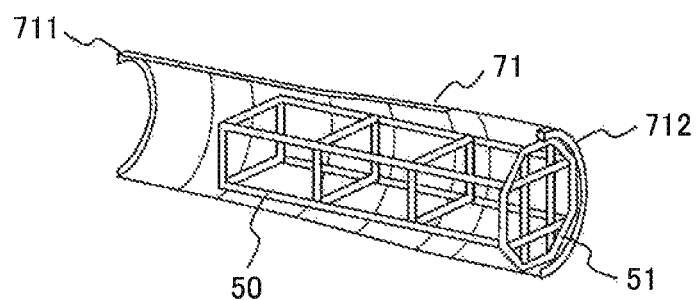
Figure 4:
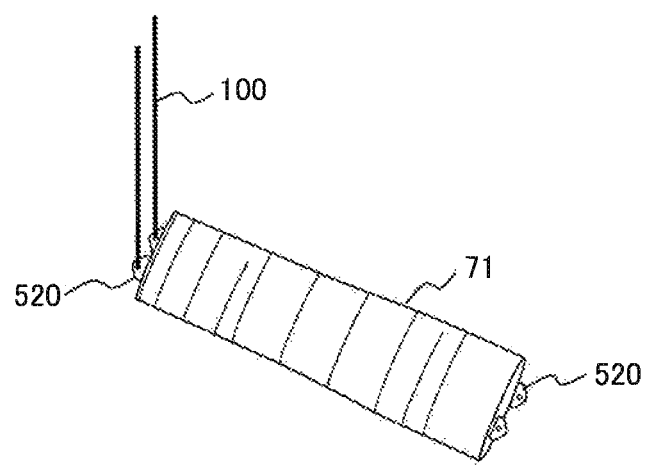

FIG. 4 illustrates the tower section 71. The tower section 71 is the lowermost tower section of the tower. Multiple electrical products (internal devices) such as an uninterruptible power system, a power converter, or a control board, are attached to the tower section 71. (1) and (2) of FIG. 4 illustrate a circumstance in which a rack 50 is attached in the tower section 72 in a factory delivery state and illustrating an inner side of the tower of one of the two sections into which the tower section is divided in a longitudinal direction of the tower. A ladder 60 (refer to FIG. 6) is attached to the inner side of the other one in the tower. The rack 50 is provided to form a plurality of floors on which the electrical products are installed in the tower. The rack 50 of the example is to form four floors (four-story structure) in the tower.

As illustrated in (1) of FIG. 4, the rack 50 is inserted into the tower section 71 from a lower end side (right side in FIG. 4) in a state in which the tower section is laid, and a floor board (first floor) 51 is inserted thereinto after the rack 50 is inserted. The floorboard 51 inserted into the tower section 71 rotates 90 degrees, and the floorboard 51 is mounted on the flange 712 of the lower end of the tower section 71 when the tower section 71 stands. The flange 712 is formed on the inner circumferential side of the tower. In addition the lower end of the rack 50 and the floor board 51 are firmly fixed.

Hanging jigs 520 are detachably attached to the flange 711 of the upper end of the tower section 71, and a flange 712 of the lower end, respectively, after the assembly preparation is ended, and hanging is performed by the onshore crane 100. The flange 722 of the lower end of the tower section 72 is connected to the flange 711 of the upper end of the tower section 71. The flange 712 of the lower end of the tower section 71 is connected to a flange provided on the top end of the foundation 10. In addition, the flanges are formed on the inner circumference side of the tower.

Figure 5:
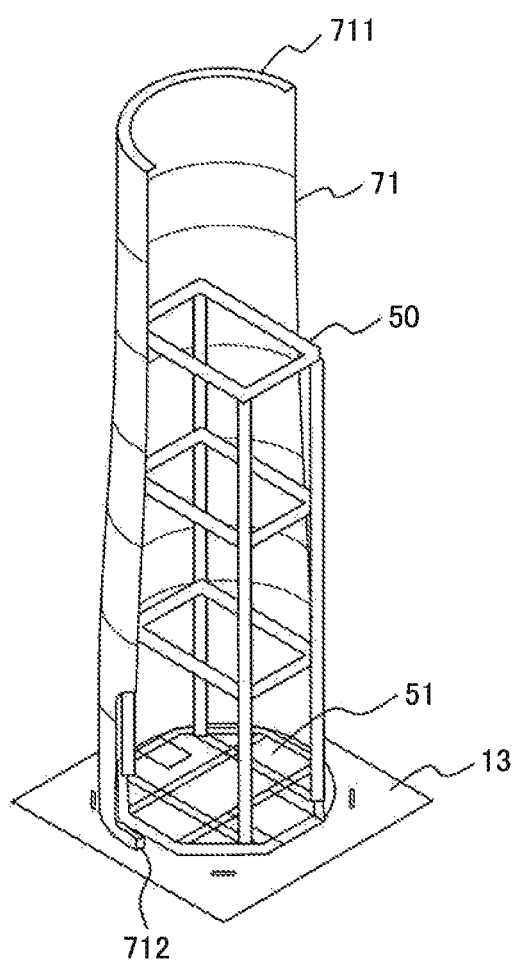
FIG. 5 is a view depicting the lowermost tower section of the tower that is divided into the three sections, and illustrating a state in which the lowermost tower section is disposed on a temporary foundation.

As illustrated in FIG. 5, the tower section 71, of which the assembly preparation is completed, is disposed on the temporary foundation 13 provided on the onshore operation place, by using the onshore crane 100. Installation is performed by the same operation as the installation operation of the onshore wind turbine on the temporary foundation 13. The hanging jigs 520 are removed after the handing operation is completed. Note that the hanging jig 520 attached to the flange 712 on the lower end is removed after the tower section 71 is hung vertically.

Next, the electrical products (internal devices) are attached into the tower section 71 by using the onshore crane 100. The electrical products attached into the tower include, for example, a wind turbine control panel, a high-voltage machine, a power converter, uninterruptible power system. In the related art, this operation is performed by using a crane of the work platform in the sea, and, in the present invention, the operations are the onshore operations.

Figure 6:
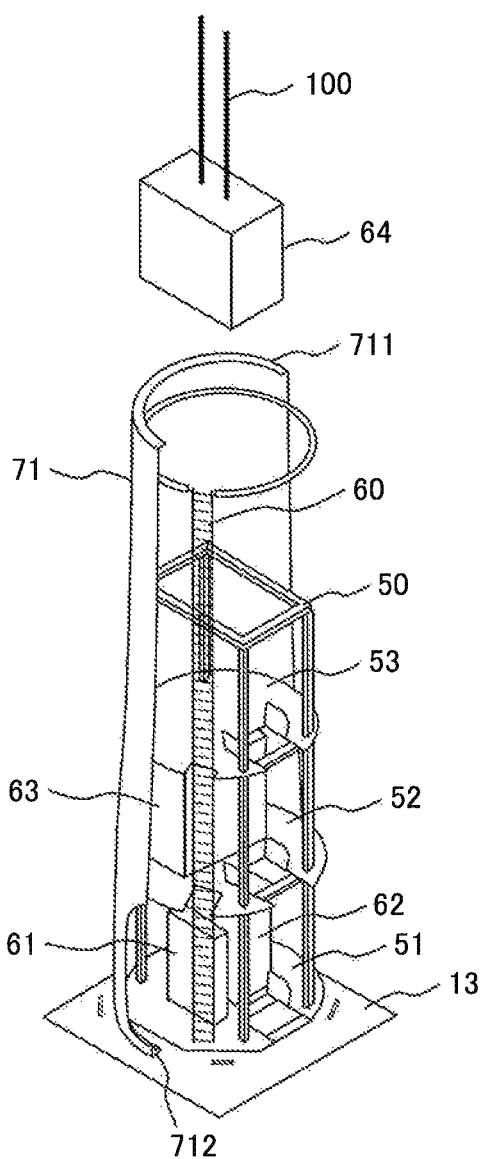
FIG. 6 is a view depicting a circumstance in which electrical products are attached on the lowermost tower section disposed on the temporary foundation, by using an onshore crane.

FIG. 6 is a perspective view of the tower section 71, in which a part of the attachment operation of the electrical products by using the onshore crane 100 is illustrated. FIG. 6 illustrates a circumstance in which the electrical products are attached on the third floor 53 by using the onshore crane 100.

Figure 7:
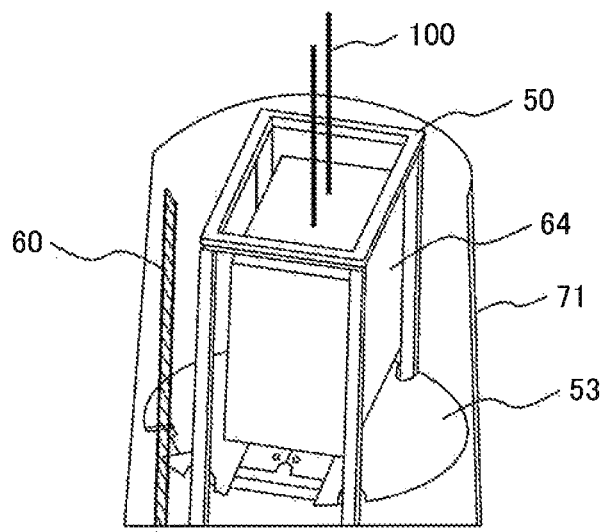
FIG. 7 is a view depicting a circumstance in which the electrical products are attached in the lowermost tower section disposed on the temporary foundation, by using an onshore crane.
Figure 7:
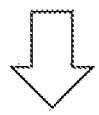
Figure 7:
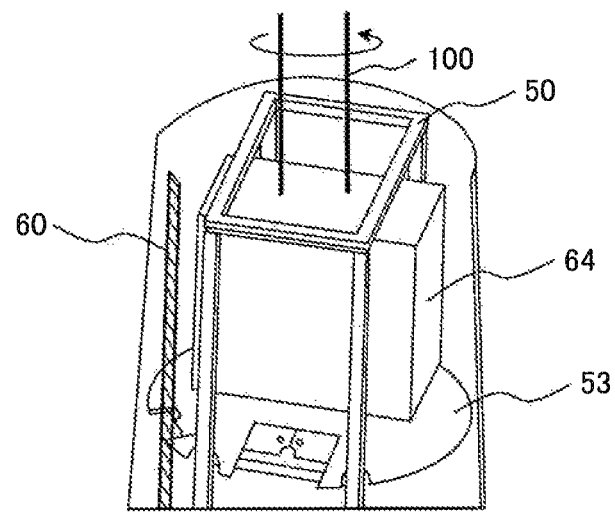

The attachment operation of the electrical products are described in detail with reference to FIG. 7. Note that, in order to be clearly viewed in FIG. 7, the fourth floor 54 or the like is omitted.

Although not illustrated in the figure, first, third floor 53 is divided into two sections and the electrical product is inserted from an opening on an upper end side of the tower section 71. Then, the third floor is disposed to be supported on a beam of the rack 50 and the third floor is assembled. As illustrated in (1) of FIG. 7, the electrical products are loaded in the tower so as to pass through the inner side of the rack 50. In a stage in which the top end of the electrical products is positioned below a beam of the rack 50, the orientation of the electrical products is caused to rotate by 90 degrees and the electrical products are mounted on the third floor. The onshore operations include loading of the floor board, repeating the loading of the electrical products, and ending the attachment operation of the electrical products into the tower section 71 using the onshore crane 100. In the example, the case in which the attachment operation of the electrical products is performed from above using the onshore crane 100 is described as an example; however, the electrical products are loaded and attached from the entrance 56 (a position at which a tower door 8 is provided) into the tower section 71.

Figure 8:
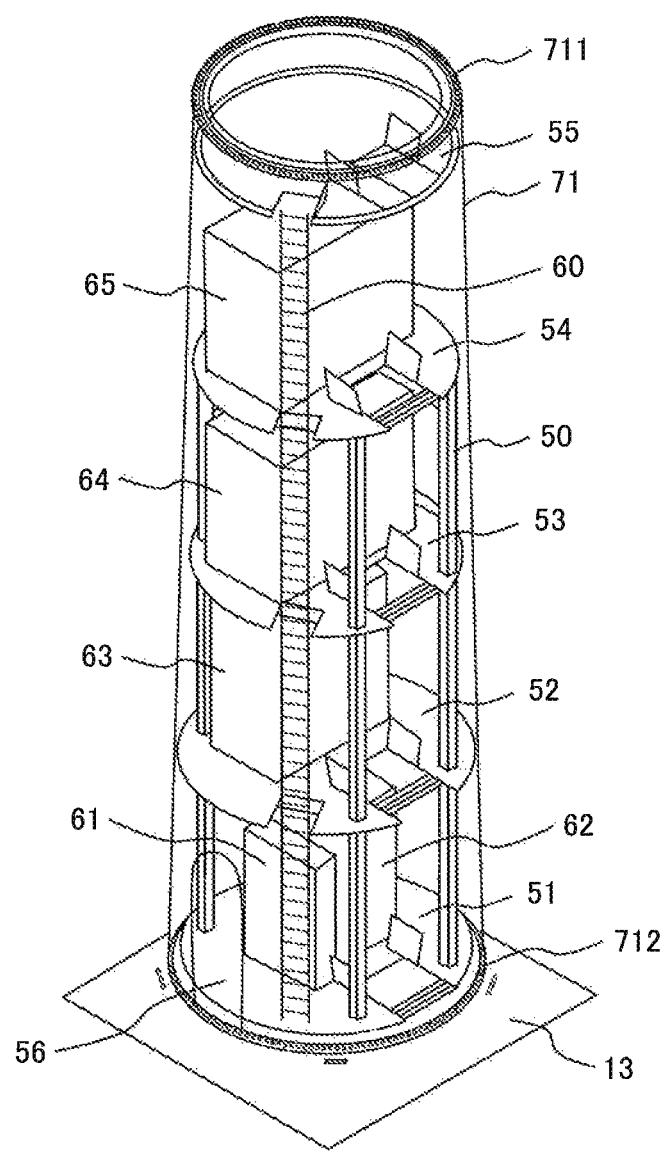
FIG. 8 is a view depicting a state in which the electrical products are completely attached in the lowermost tower section disposed on the temporary foundation.

When the attachment of the electrical products into the tower section 71 is ended, the attachment of the other internal devices or a connection operation between the electrical products is performed. FIG. 8 illustrates a state in which the operations are ended. Note that, in FIG. 8, reference numbers 52, 54, and 55 represent a second floor, a fourth floor, and a fifth floor, respectively. The fifth floor 55 is held to be hung from the flange 711 of the tower section 71. In addition, reference number 56 represents the entrance 56 (tower door 8 not illustrated) into the tower section 71, which is formed in a lower portion of the tower section 71. In addition, reference number 61 represents a first electrical product disposed on the first floor, reference number 62 represents a second electrical product disposed on the first floor, reference number 63 represents a third electrical product disposed on the second floor, reference number 64 represents a fourth electrical product disposed on the third floor, and reference number 65 represents a fifth electrical product disposed on the fourth floor. The electrical products are a wind turbine control panel, a high-voltage machine, a power converter, or the like which are attached to the tower section 71, and installation of the electrical products is performed by using the crane.

Figure 9:
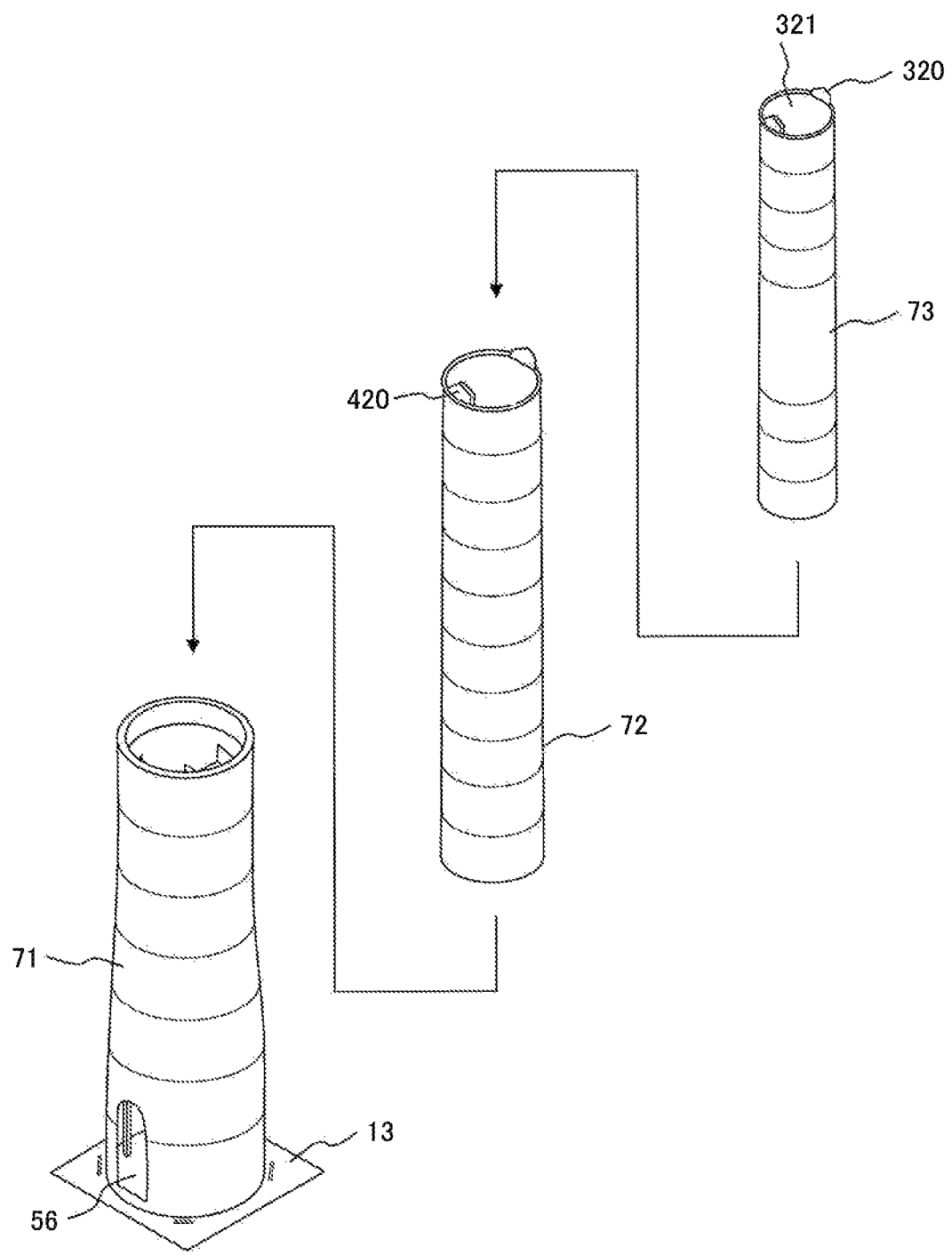
FIG. 9 is a view depicting a circumstance in which the three divided tower sections are assembled on the temporary foundation.

Next, as illustrated in FIG. 9, in the onshore operation place, the tower is assembled by using the onshore crane. The tower section 72 is mounted on the tower section 71. Then, the flange 711 of the tower section 71 and the flange 722 of the tower section 72 are firmly connected by using a fastener such as a bolt. Then, the hanging jig 420 is removed from the upper end of the tower section 72. Then, the tower section 73 is mounted on the tower section 72, the flange 721 of the tower section 72 and the flange 732 of the tower section 73 are firmly connected by using a fastener such as a bolt. The installation operations of the onshore wind turbine are performed by the same method. The hanging jig 320 of the top end of the tower section 73 is attached as it is. A rain-proof lid 321 is provided on the hanging jig 320 such that rainwater is prevented from infiltrating into an opening on the top end of the tower section 73. Accordingly, the tower, to which the electrical products are attached in the onshore operation, is completed. In addition, as a vibration (resonance) absorber of the tower during the storage of the tower, a rope, to which an anti-vibration fin having a projecting shape is attached, is wound around the tower 7 in some cases.

Figure 10:
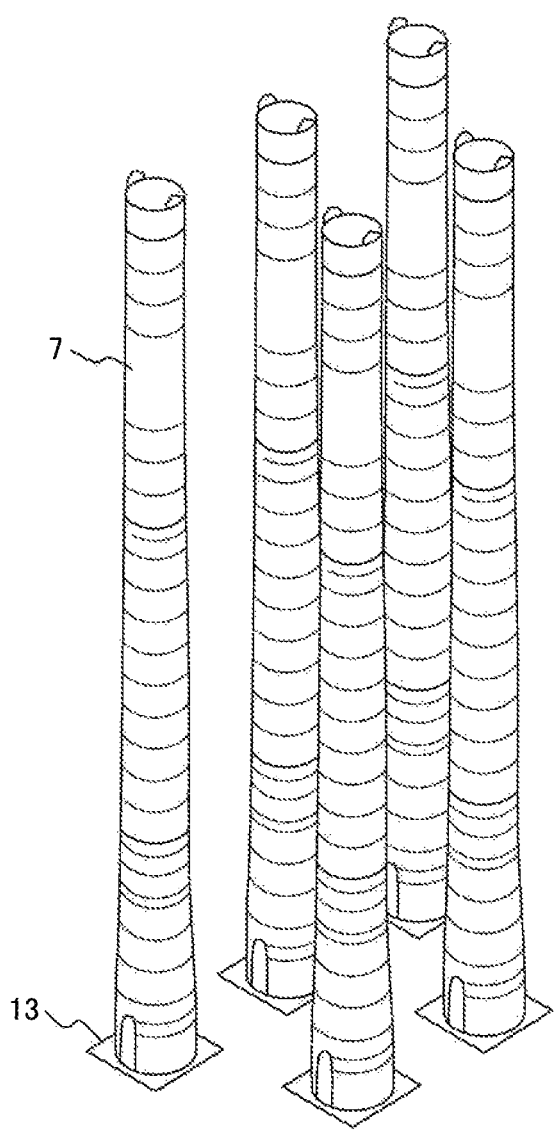
FIG. 10 is a view depicting storage of a tower completion on the temporary foundation.

As illustrated in FIG. 10, the completed tower is stored to be disposed on the temporary foundation 13 until the attachment process to the foundation in the sea is started. Note that this tower is referred to as a tower completion.

Note that, due to some reason, in a case where it is preferable that the tower has a small height during the storage, for example, the tower section 71 and the tower section 72 are connected to each other and the tower section 73 may be separately stored.

Next, modularization of the electrical products which are not attached to the tower 7 (tower section 71) will be described. As the electrical products that are attached to the wind turbine, examples of the large electrical products other than those described above include the transformer or the switch device. The transformer is disposed in the nacelle in some cases; however, in the case where the transformer is disposed in the nacelle, the weight of the nacelle is increased. Regarding a relationship with capacity of the crane during the assembly of the wind turbine or in terms of reducing the resonance with the foundation, it is preferable that the weight of the nacelle is reduced. Therefore, the transformer is often disposed on the tower side. Meanwhile, in the case where the electrical products are attached to the tower, specifically, the electrical products are collectively attached in the tower section 71. In addition, the transformer or the switch device is normally disposed below the tower. Therefore, in a case where a high-voltage device such as the transformer or the switch device is also attached to the tower section 71, the transformer or the high-voltage device can be poured out from the lower side of the tower. In this case, the high-voltage device, which is poured out from the lower portion of the foundation and the tower, needs to be considered not to inadvertently come into contact with the foundation when the tower section 71 is installed. In the example, the special high-voltage devices such as the transformer or the switch device are not attached to the tower section 71, and are modularized to be attached to the foundation, and efficiency of the operation performed by using the crane of the work platform is achieved.

The modularization of the electrical products is described with reference to FIG. 11. As illustrated in (1) and (2) of FIG. 11, a floor 81 and a frame 82 are firmly fixed to each other, a transformer (oil-immersed transformer or the like) 84 is loaded by using the onshore crane 100 so as to be installed on the floor 81 in a modularizing support structure that is configured of the floor 81 and the frame 82.

Figure 11:
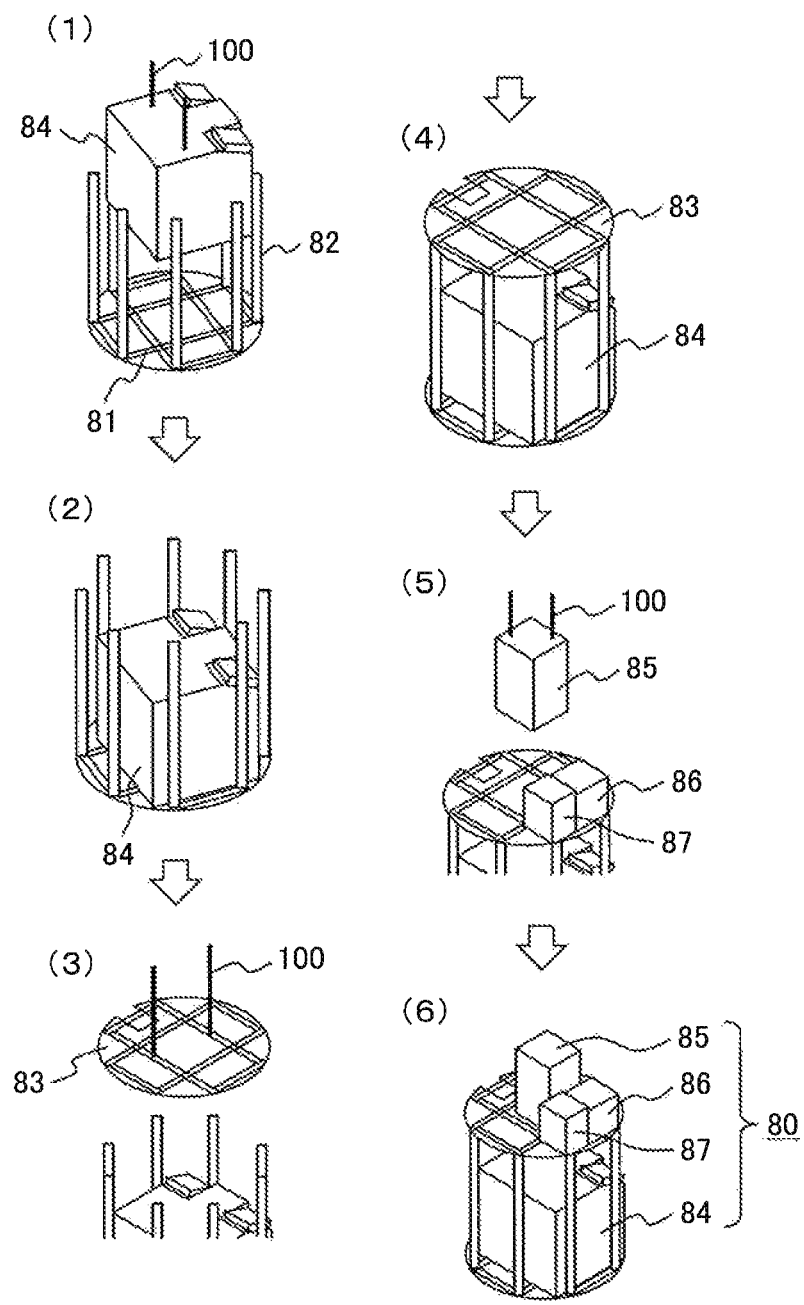
FIG. 11 is a view depicting modularization of special high-voltage devices.

Then, as illustrated in (3) and (4) of FIG. 11, a floor 83 is attached to a frame by using the onshore crane 100, and the floor 83 is used as an attachment place for the electrical products other than the transformer. Then, as illustrated in (5) and (6) of FIG. 11, a special high-voltage machine 85 including the switch device is installed on the floor 83 together with an auxiliary transformer 86 or a tower auxiliary transformer 87. It is preferable that the auxiliary transformer 86 or the tower auxiliary transformer 87 is attached to the tower section 71 side; however, when only the special high-voltage machine 85 is disposed on the floor 83, large space remains empty, and thus the auxiliary transformer 86 or the tower auxiliary transformer 87 becomes a target of the modularization. Note that it is desired that the transformer 84 and the special high-voltage machine 85 are connected at this stage; however, the connection is not necessarily performed at the stage.

A hanging jig (not illustrated) for performing hanging performed by the crane is attached to the top portion of the frame 82 or the floor 83. In addition, a ladder (not illustrated), which is used by an operator, is provided between the floor 81 and the floor 83.

In this manner, the electrical products are modularized, and thereby it is possible to attach the many electrical products, which require the crane operation, to the foundation in the sea by the hanging and installing once by the crane of the work platform. The modularized electrical products are disposed below the tower completion. Hence, the modularized electrical products are referred to as a lower electrical module completion 80.

Note that, in the example illustrated in FIG. 11, a ceiling is not provided to cover the top portion of the special high-voltage machine 85 or the like; however, the height of the frame 82 is increased, and then, a ceiling may be attached to the upper portion of the frame 82 so as to cover the upper portion of the special high-voltage machine 85 or the like. In this case, the ceiling can be used as a scaffold for the operator during an operation in the sea.

Figure 12:
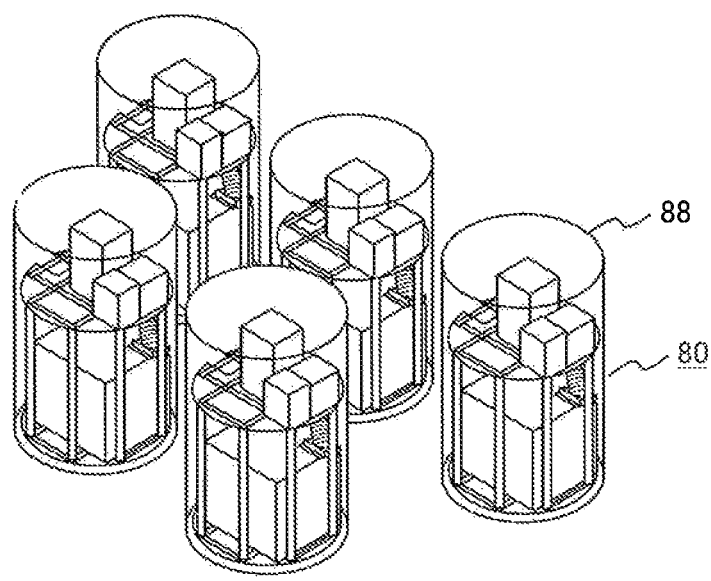
FIG. 12 is a view depicting storage of a lower electrical module completion.

The lower electrical module completion 80 is packaged in a package 88 and is stored as illustrated in FIG. 12. Note that the electrical products may be individually packaged.

Next, installation of the tower completion and the lower electric module completion on the foundation will be described.

Figure 13:
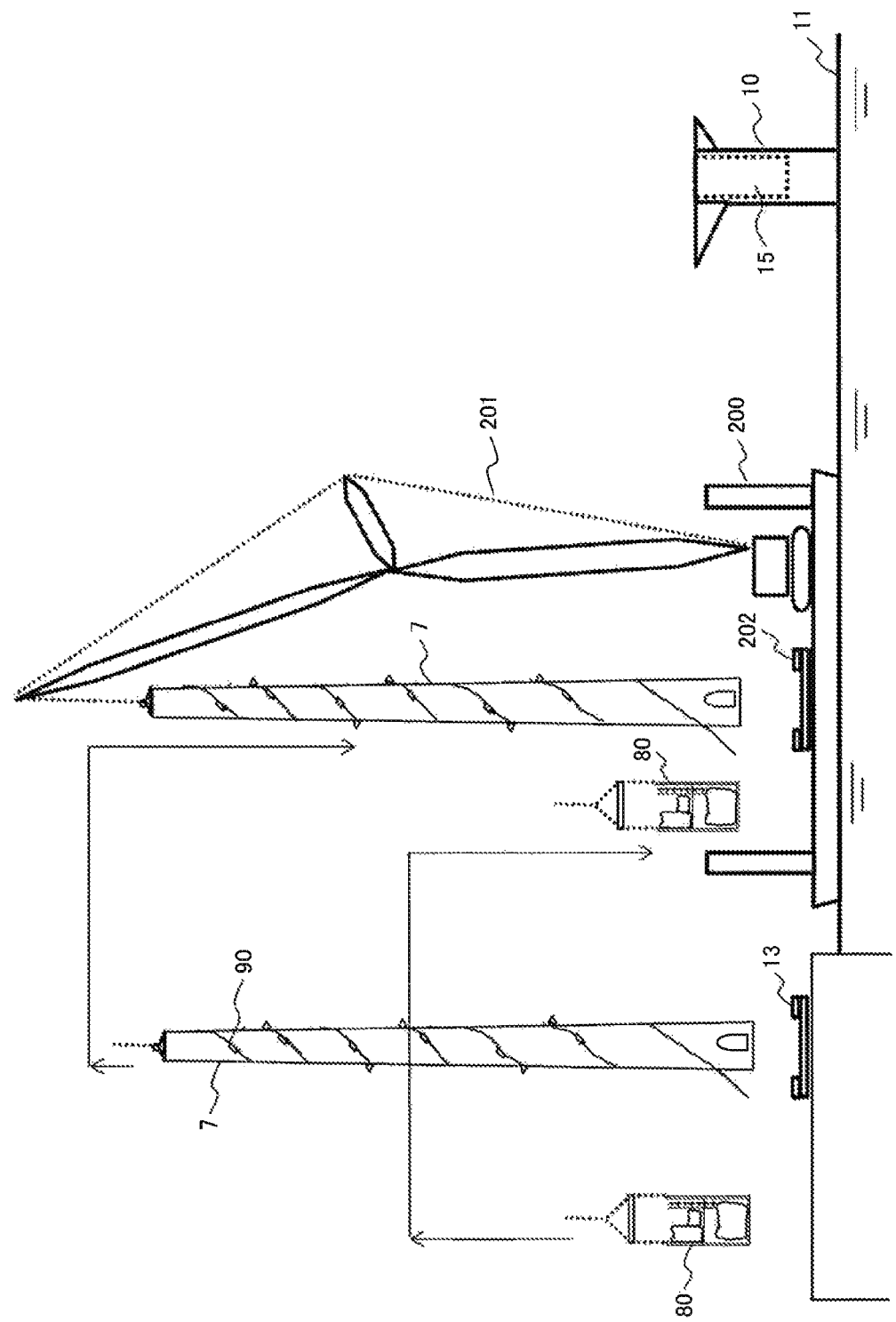
FIG. 13 is a view depicting a circumstance in which the tower completion and the lower electrical module completion are stowed on a self-elevating work platform.

As illustrated in FIG. 13, a self-elevating type work platform 200 is prepared to be close to the onshore operation place.

The work platform 200 includes a platform and lifting legs and the platform is lifted over the sea surface and the work platform is a platform that performs the operation of the crane or the like. The platform is lifted to a height, where there is no influence of waves, and is maintained, thereby, there is no undulation of a ship due to wind and waves, and thus efficiency of the operation and accuracy of the construction are increased. A crane 201 is provided on the work platform 200. In addition, in the example, a temporary foundation 202 is provided to the work platform 200.

The tower 7 (tower completion) is detached from the temporary foundation 13 using the crane 201 of the work platform in the onshore operation place, and is mounted on the temporary foundation 202 on the work platform, and then the lower end of the tower 7 is fixed to the temporary foundation. In addition, the lower electrical module completion 80 is also mounted on the work platform 200 using the crane 201 of the work platform. In addition, a wind turbine component such as the nacelle 6 (not illustrated) or the like is mounted on the work platform.

The work platform 200, on which the tower completion and the lower electric module completion are mounted, moves to an installation place. The foundation 10 is provided at the installation place. In the example, the accommodation space 15, which accommodates the lower electrical module completion 80, is formed in the foundation 10.

Figure 14:
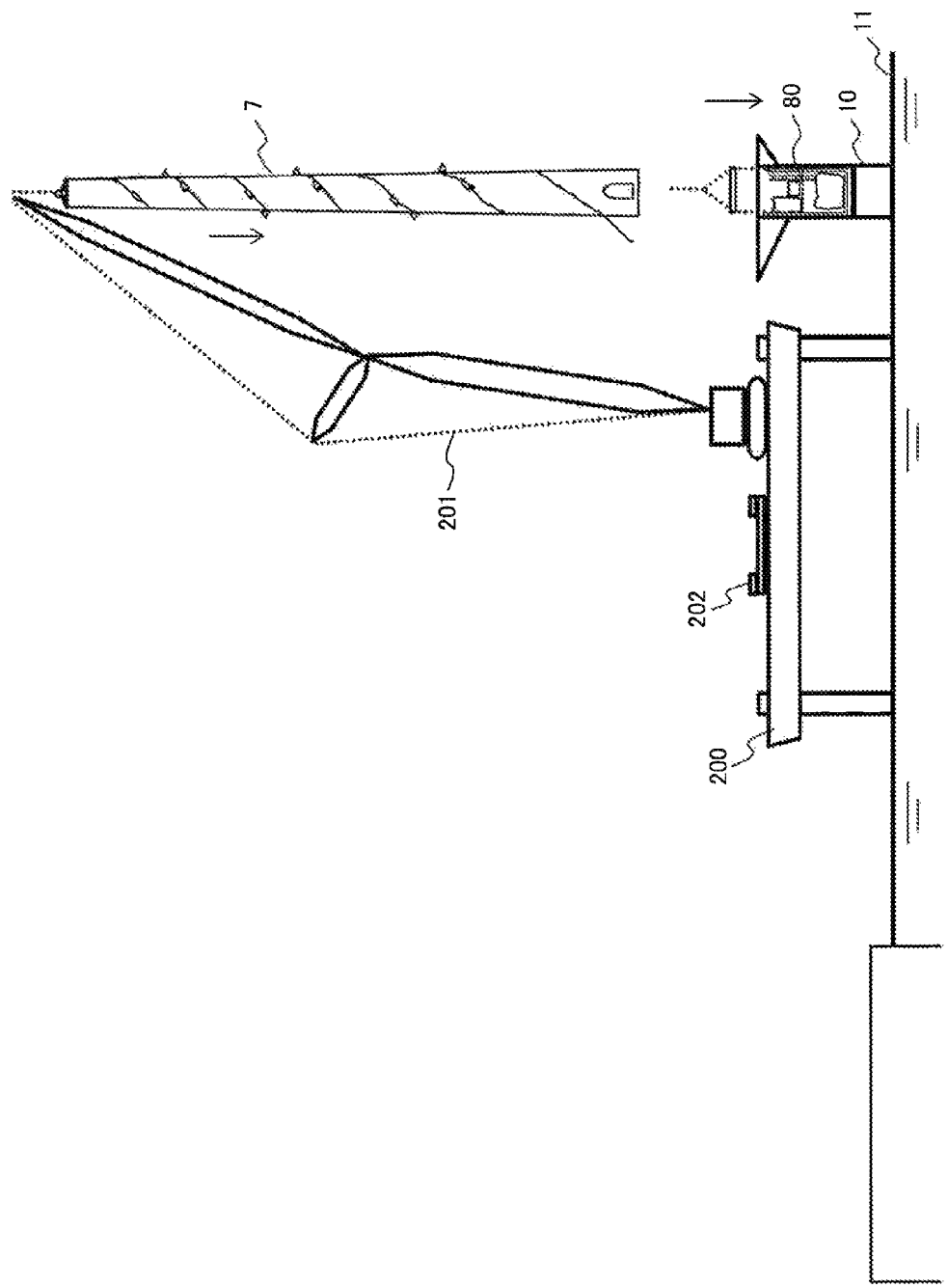
FIG. 14 is a view depicting a circumstance in which the tower completion and the lower electrical module completion are installed on the foundation by using the self-elevating work platform.

As illustrated in FIG. 14, the work platform 200 arrives at the installation place, and the platform of the work platform is lifted. First, the lower electrical module completion 80 is loaded, using the crane 201 of the work platform, into the accommodation space 15 of the foundation 10, and is mounted on the floor of the accommodation space 15. At this time, a slight shift is permissible in an orientation of the mounting of the lower electrical module completion 80; however, the orientation matches a predetermined orientation with respect to the foundation 10 using an assist rope or the like such that a predetermined relationship is formed between the module completion and the electrical products in the tower, which is disposed later in the foundation 10. The lower electrical module completion 80 is supported on the floor in the accommodation space 15 of the foundation 10, the floor in the accommodation space 15 has sufficient strength so as to support the weight of the lower electrical module completion 80. In addition, since the electric products on the tower side are supported by the flange 712 of the tower section 71 via the rack 50, large weight of the tower side is not applied to the support structure of the lower electrical module completion 80.

In addition, the foundation 10 is configured to form the accommodation space 15 such that the top portion of the lower electrical module completion is positioned below the top end of the foundation 10. The foundation 10 is configured in this manner, and thereby, it is possible to avoid a state in which the lower end of the tower inadvertently comes into contact with the lower electrical module completion, when the tower completion is installed in the foundation 10. In addition, since a joined portion (connection portion) between the lower end of the tower and the top end of the foundation does not interfere with the disposing of the tower, it is possible to stably and reliably perform the disposing of the tower to the foundation.

Next, the tower completion is installed on the foundation 10 using the crane 201 of the work platform. The flange 712 of the lower end of the tower section 71 of the tower completion is fixed to an attachment flange (not illustrated) provided on the foundation 10, and thereby the installation of the tower including the electrical products is completed. Note that, when the tower completion is installed on the foundation 10, fit marks are provided on the flange 712 of the tower section 71 and the flange on the foundation 10 side, respectively, such that a positional relationship between the electrical products or the like in the tower and the lower electrical module completion or the like matches a predetermined relationship, and then, positioning is performed using the fit marks. Since the lower electrical module completion is installed at a predetermined position with respect to the foundation 10, the positional relationship between the electrical products or the like in the tower and the lower electrical module completion matches the predetermined positional relationship. Therefore, wire connection (cable connection) between a part of the electrical products attached to the tower side and a part of the electrical products of the lower electrical module completion is reliably performed. A cable, which connects a part of the electrical products attached to the tower side and a part of the electrical products of the lower electrical module completion, passes through the connection portion between the lower end of the tower and the top end of the foundation; however, since the cable is provided after the disposing of the tower, the cable does not interfere with the operation of the disposing of the tower on the foundation.

In the example, the operation is completed by using the crane of the work platform twice, and thus it is possible to significantly shorten the construction time of the operation in the sea.

After the disposing of the tower completion is completed, the hanging jig 320 attached to the upper end of the tower section 73 is removed. Since the hanging jig 320 is attached to the flange 731 of the tower section 73, a bolt, which fixes the hanging jig 320 and the flange 731, is removed from the inside of the tower. In addition, an anti-vibration fin 90 is also removed. In addition, the lower electrical module completion 80 illustrated in FIGS. 13 and 14 shows a case where the electrical products are individually packaged, and the packages of the electrical products are also removed.

Then, the nacelle 6 is installed in the tower 7 by using the crane 201 of the work platform. In other words, the nacelle is attached, with a bolt, to the flange 731 of the tower section 73. Then, the blade 1 is attached to a hub at the front end of a rotor that is supported on the nacelle 6 by using the crane 201 of the work platform. Thus, the installation operation of the offshore wind turbine is basically completed.

Note that the invention is not limited to the example described above, and includes various modification examples.

For example, the example described above is described in detail such that it is easy to understand the invention, and the invention is not limited to an example that has the entire configurations described above. In addition, it is possible to interchange between a part of a configuration of an example and the configuration of another example, and it is possible to add a configuration of an example to a configuration of another example. In addition, it is possible to add, remove, and interchange a configuration with respect to a part of the configurations of the examples.

What is claimed is:

1. A method for constructing an offshore wind turbine for use in a marine environment, comprising:
    attaching all or a part of electrical products to a tower on land;
    stowing, on a work platform, the tower to which the electrical products are attached; and
    disposing, on a foundation, the tower to which the electric products are attached, by using a crane of the work platform at sea, wherein
        the foundation has an accommodation space in which a module of a plurality of high-voltage devices is disposed,
        the accommodation space faces upward so that the accommodation space is configured to accept a modulized product from above the accommodation space, but not from below the accommodation space, and
        the accommodation space is formed such that the top portion of the module of the plurality of high-voltage devices is positioned below the top end of the foundation when the module of the plurality of high-voltage devices is disposed in the accommodation space.

2. The method for constructing an offshore wind turbine according to claim 1,
    wherein the electrical products are classified into a plurality of high-voltage devices and the other electrical products,
    wherein the plurality of high-voltage devices are modularized on land,
    wherein the other electrical products are attached to the tower on land,
    wherein a module of the plurality of high-voltage devices and the tower, to which the other electrical products are attached, are stowed on the work platform, and
    wherein the module of the plurality of high-voltage devices is disposed on the foundation by using the crane of the work platform in the sea, and then the tower, to which the other electrical products are attached, is disposed on the foundation.

3. The method for constructing an offshore wind turbine according to claim 1,
    wherein the tower is divided into a plurality of tower sections in a height direction thereof,
    wherein the attachment of the electrical products to the tower is performed by attaching the products to the lowermost tower section with the lowermost tower section disposed on a temporary foundation, and
    wherein the plurality of tower sections are assembled.

4. An offshore wind turbine for use in a marine environment, comprising:
    a tower that is disposed on a foundation at sea; and
    electrical products,
    wherein the tower is configured to be divided into a plurality of tower sections in a height direction,
    wherein the electrical products are classified into a first electrical product group that is disposed on the foundation and a second electrical product group that is disposed in the tower,
    wherein the electrical products in the first electrical product group are modularized and are disposed in an accommodation space that faces upward and is formed in the foundation directly below the tower section, and wherein the electrical products in the second electrical product group are attached to the lowermost tower section of the plurality of tower sections.

5. The offshore wind turbine according to claim 4, wherein the first electrical product group includes a high-voltage device.

6. The offshore wind turbine according to claim 5, wherein an entrance into the tower is formed in a lower portion of the lowermost tower section, and wherein the entrance has a height reaching above the top end of the electrical products in the modularized first electrical product group.

7. The offshore wind turbine according to claim 4, wherein the electrical products in the first electrical product group are attached to the foundation.

8. The offshore wind turbine according to claim 7, wherein the accommodation space formed in the foundation is formed such that the top portion of the electrical products in the modularized first electrical product group is positioned below the top end of the foundation when the electrical products in the modularized first electrical product group are disposed in the accommodation space.

9. The offshore wind turbine according to claim 8, wherein at least a part of the electrical products in the first electrical product group and at least a part of the electrical products in the second electrical product group are electrically connected via a cable.

10. The offshore wind turbine according to claim 4, further comprising:

a rack that is supported on a lower side flange of the lowermost tower section and is provided in the lowermost tower section, wherein the rack has a plurality of floors, and wherein the electrical products in the second electrical product group are disposed on the plurality of floors.

11. Offshore wind power generating equipment comprising:

the offshore wind turbine according to claim 4; and the foundation on which the offshore wind turbine is disposed.

* * * * *